United States Patent [19]

Eagle et al.

[11] Patent Number: 5,315,310
[45] Date of Patent: May 24, 1994

[54] CATHODE RAY TUBE DISPLAY APPARATUS

[75] Inventors: David J. Eagle, Chandlers Ford, England; Andrew J. Morrish, West San Jose, Calif.

[73] Assignee: International Business Machines Corporation, Armonk, N.Y.

[21] Appl. No.: 985,772

[22] Filed: Dec. 4, 1992

[30] Foreign Application Priority Data

Dec. 19, 1991 [GB] United Kingdom ............ 9126997

[51] Int. Cl.$^5$ ............................................. G09G 1/06
[52] U.S. Cl. ........................................ 345/14; 345/13; 345/23
[58] Field of Search ............ 340/732, 733, 738, 730, 340/734, 735, 790, 791, 728; 345/10, 11, 13, 14, 23-26

[56] References Cited

U.S. PATENT DOCUMENTS

| | | | |
|---|---|---|---|
| 3,422,304 | 1/1969 | Thorpe | 340/738 X |
| 4,215,414 | 7/1980 | Huelsman | 340/728 X |
| 4,322,750 | 3/1982 | Lord et al. | 340/728 X |
| 4,354,186 | 10/1982 | Groothuis | 340/728 |
| 4,521,774 | 6/1985 | Murphy | 340/791 X |
| 4,697,177 | 9/1987 | Schine | 340/728 |

Primary Examiner—Ulysses Weldon
Attorney, Agent, or Firm—Mark S. Walker; William A. Kinnaman, Jr.

[57] ABSTRACT

Cathode ray tube display apparatus comprises a cathode ray tube display screen for displaying successive frames of a non-interlaced video image in response to excitation by at least one raster-scanned electron beam. A line timebase circuit sequentially addresses each electron beam to successive pixels on the screen in a line of a raster in response to a line timebase sync signal. A frame timebase circuit sequentially addresses each electron beam to successive lines of the raster in response to a frame timebase sync signal. The frame timebase circuit comprises means for offsetting successive frames of the video image in a direction transverse of the lines of the raster by a distance less than the spacing of adjacent lines of the raster. Gaps between adjacent pixels on successive lines of the raster are made invisible to the viewer because the persistence of viewer's eye effectively integrates the image content of successive frames. Also, because the successive frames have the same image content, there is no low-frequency component in the image spectrum below the frame timebase frequency. Therefore, the displayed image is free from objectionable flicker.

7 Claims, 3 Drawing Sheets

CATHODE RAY TUBE DISPLAY APPARATUS

BACKGROUND OF THE INVENTION

1. Field of the Invention

The present invention relates to cathode ray tube (CRT) display apparatus for displaying successive frames of a non-interlaced video image with improved character legibility.

2. Description of the Related Art

A CRT display, such as a computer visual display unit or a television receiver for example, conventionally comprises a line timebase circuit for sequentially addressing one or more electron beams to successive pixels in a line from one side of a CRT to the other in response to a line timebase synchronization signal, and a frame timebase circuit for sequentially addressing each electron beam to successive lines from the top of the CRT to the bottom in response to a frame timebase synchronization signal. In operation, each electron beam follows a zigzag pattern over the area of the CRT screen. The zigzag pattern is usually, and will hereinafter be, referred to as a raster.

In the interests of maximizing the legibility of the video image, it is desirable to minimize the spacing between adjacent lines of the raster. This requires a high raster line density and a small electron beam spot size. However, in a color CRT, if the spot size is sufficiently small, the temporal frequency at which the electron beams are scanned across the lines of the raster can interact with the spatial frequency of the perforations in the shadow mask to generate an objectionable Moiré fringe pattern on the CRT screen. Moiré fringe patterns are especially common in displays capable of operating at any one of a range of line scan frequencies because it is difficult to optimize the spatial frequency of the perforations in the shadow mask to prevent them at all frequencies in the range. This problem can be overcome using a larger spot size. However, this militates against obtaining a high contrast ratio between elements of characters such as "m" and "e".

SUMMARY OF THE INVENTION

In accordance with the present invention, there is now provided cathode ray tube display apparatus comprising: a cathode ray tube display screen for displaying successive frames of a non-interlaced video image in response to excitation by at least one raster-scanned electron beam; a line timebase circuit for sequentially addressing each electron beam to successive pixels on the screen in a line of a raster in response to a line timebase sync signal; and a frame timebase circuit for sequentially addressing each electron beam to successive lines of the raster in response to a frame timebase sync signal; characterized in that the frame timebase circuit comprises means for offsetting successive frames of the video image in a direction transverse of the lines of the raster by a distance less than the spacing of adjacent lines of the raster.

The present invention is based on the realization that gaps between adjacent pixels on successive lines of the raster, that are produced by reducing the electron beam spot size to increase the inner contrast ratio of displayed characters, can be made invisible to the viewer by shifting successive frames of the video image in a direction transverse of the lines of the raster by a distance less than the spacing of adjacent lines of the raster. Because the persistence of a viewer's eye effectively integrates the image content of successive frames, the relative movement of pixels between successive frames remains undetected. Thus, in appearance, a displayed character has smooth, unbroken strokes. Furthermore, because the successive frames have the same image content, there is no low-frequency component in the image spectrum below the frame timebase frequency. Therefore, the displayed image is free from objectionable flicker.

The present invention thus permits a small spot size to improve character legibility along successive lines of the raster without impairing character legibility between successive lines of the raster.

It will be appreciated that the present invention extends to both color and monochrome CRT displays. Indeed, when applied to a color CRT display, the present invention advantageously tends to prevent generation of objectionable Moiré fringe patterns screen because the spaces between adjacent lines of the raster in one frame are effectively filled in by the lines of the raster in the next frame.

Preferably, the offset means comprises a divide-by-two counter responsive to the line timebase sync signal for generating a square wave signal of half the frequency of the line timebase sync signal in such a manner that successive frames of the raster correspond to alternate levels of the square wave signal. Advantageously, the counter permits successive frames of the video image to be identified without the need for complex electronic circuitry. Furthermore, the counter may be conveniently implemented by a widely available and inexpensive integrated circuit package.

In a preferred embodiment the present invention the frame timebase generator comprises a ramp signal generator for generating a ramp signal in response to the frame timebase sync signal, and the offset means comprises a summing amplifier for adding the square wave signal to the ramp signal to offset successive frames of the video image. Thus, successive frames of the video image may be offset by simple, and hence advantageous, addition of two electrical signals.

The offset means may further comprise an analog multiplexer for selecting any one of a plurality of amplitudes for the square signal in response to a digital control signal indicative of a desired one of a plurality of display modes of operation.

The present invention may thus advantageously extend to CRT displays that are operable within a range of line refresh frequencies and a range of frame refresh frequencies as well as those that are operable only at fixed line and frame refresh frequencies.

In a particularly preferred embodiment of the present invention, the frame timebase circuit is configured to respond to a frame sync signal of a frequency of at least 75 Hz. Therefore, the pixel positions are modulated at a frequency of at least 37.5 Hz.

BRIEF DESCRIPTION OF THE DRAWINGS

Preferred embodiments of the present invention will now be described, by way of example only, with reference to the accompanying drawings in which.

DESCRIPTION OF THE PREFERRED EMBODIMENTS

Figure 1:
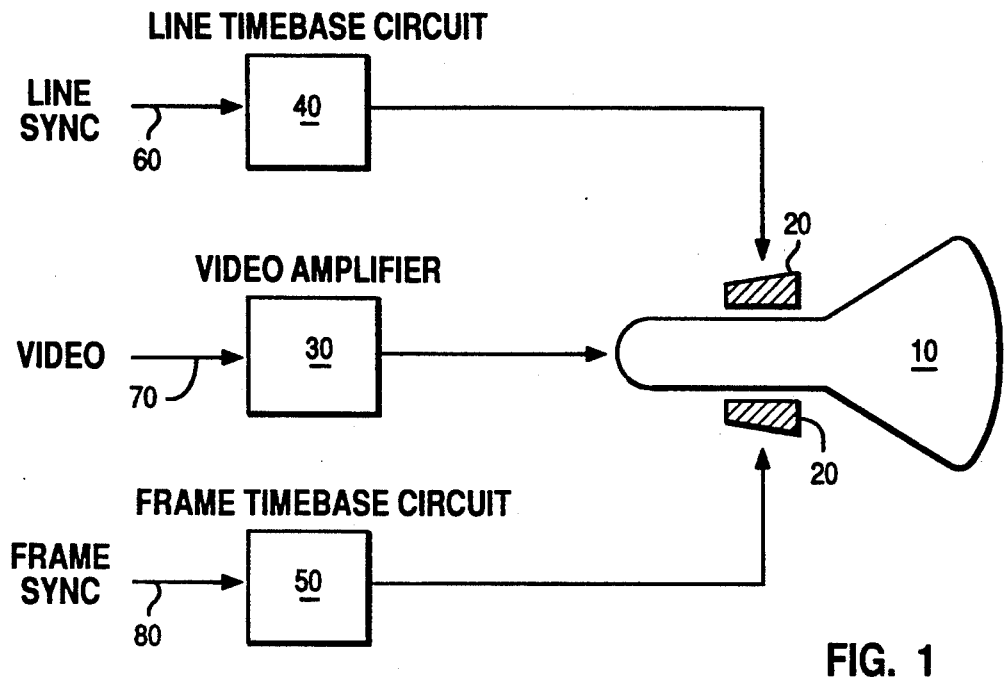
FIG. 1 is a block diagram of a CRT display of the present invention.

Referring first to FIG. 1, a monochrome CRT display of the present invention comprises a monochrome cathode ray tube 10 having an electromagnetic coil assembly or yoke 20. A video amplifier 30 is connected to an electron gun (not shown) enclosed in the cathode ray tube 10. The yoke comprises line and frame deflection coils (not shown) respectively connected to a line timebase circuit 40 and a frame timebase circuit 50.

In operation, the energy of an electron beam generated by the electron gun and directed towards the screen of the CRT is modulated by an input video signal 70. The line timebase circuit generates a sawtooth deflection current in the line deflection coils for sweeping the electron beam from one side of the screen to the other during a scan period and then rapidly returning the electron beam during a line retrace period. To scan the electron beam over the area of the CRT screen in a raster, the frame timebase circuit simultaneously generates a sawtooth deflection current in the frame deflection coils for sweeping the electron beam from the top of the CRT screen to the bottom during a frame scan period and for rapidly returning the electron beam to the top of the screen during a frame retrace period. The outputs of the line and frame timebase circuits are respectively synchronized to the input video signal by input line and frame synchronization (sync) signals, 60 and 80. The frame period is typically equivalent to hundreds of line scan periods to generate a high resolution video image.

As mentioned earlier, in the interests of maximizing character legibility in the video image, it is desirable to minimize the spacing between adjacent lines of the raster. This minimizes the so-called brightness modulation index Lm defined by the equation $$Lm = \frac{L1 - L2}{L1 + L2}$$

where L1 is the luminance of pixels on adjacent lines of the raster and L2 is the luminance of the spacing between the pixels on the adjacent lines.

In practice, acceptable character legibility is achieved on a monochrome CRT screen when the brightness modulation index is 0.4 and on a color CRT screen when the brightness modulation index is 0.7.

Also as mentioned earlier, in the interests of further maximizing character legibility, it is desirable to maximize the contrast between passive and active elements of characters such as "m" and "e". This maximizes the so-called character inner contrast ratio, Cr, defined by the equation $$Cr = \frac{L1}{L2}$$

where L1 is the luminance of an active element of the character and L2 is the luminance of a passive element.

In practice, acceptable character legibility is achieved on a CRT screen if the character inner contrast ratio is at least 3:1.

Figure 2:
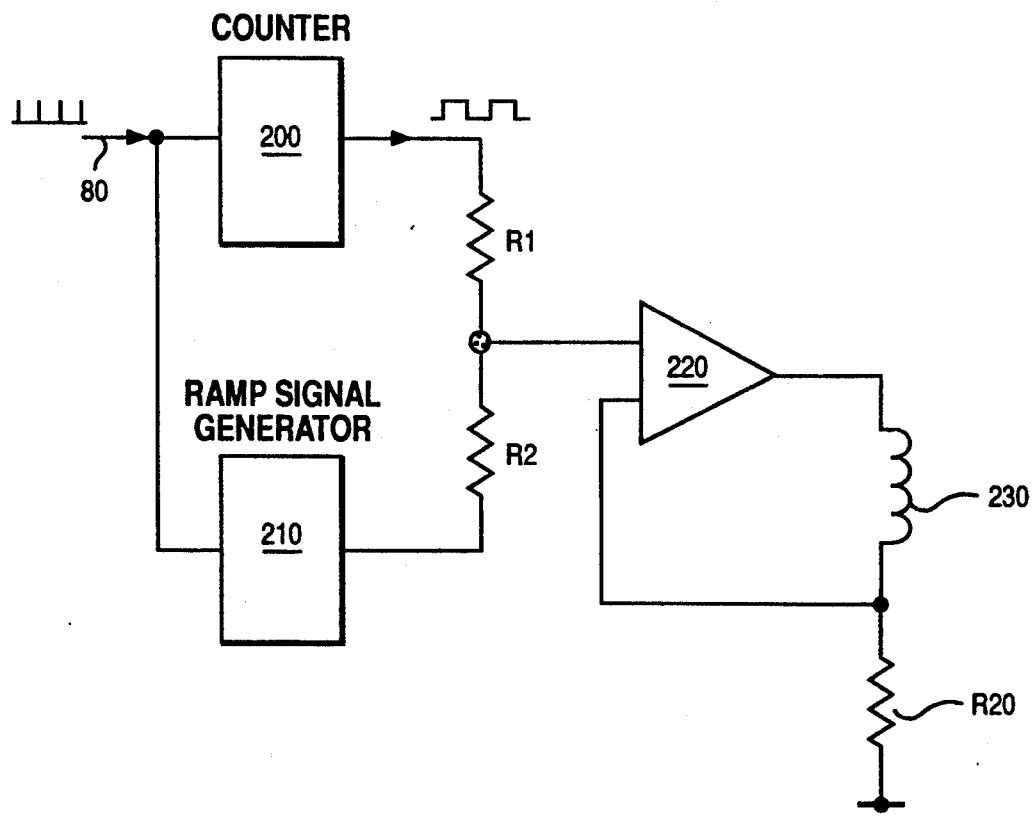
FIG. 2 is a block diagram of a frame timebase circuit in accordance with the present invention.

Referring now to FIG. 2, the frame timebase stage 50 comprises a ramp signal generator 210 having an input connected to the frame sync signal 80 and an output connected, via resistor R2 to the input of a power amplifier 220. The output of the power amplifier 220 is connected to the frame deflection coils 230 of the yoke 20. The frame sync signal is also connected to the input of a divide-by-two counter 200. The output of the counter 200 is connected via resistor R1 to the input of the power amplifier 220. Deflection coils 230 are connected to ground through resistor R20.

In operation, the ramp generator 210 generates a ramp signal at the same frequency as, and synchronized to the frame sync signal 80. The counter 200 responds to the frame sync signal by generating a square wave of half the frequency of the frame sync signal. The square wave is combined additively with the ramp signal at the input of the power amplifier 220 according to the ratio of R1 to R2. R1, R2 and the power amplifier 220 in combination therefore act as a summing amplifier. Thus, successive frames of the video image displayed on the CRT screen correspond to the alternate high and low states of the square wave. The ratio of the resistors R1 and R2 are selected in such a manner that the voltage difference between the high and low states of the square wave corresponds to an vertical offset between successive frames of the displayed video image of less than the spacing between adjacent lines of the raster. The square wave is added to the ramp signal before application of any S correction via an S correction network (not shown) so that the offset between successive frames is substantially equal from the top of the CRT screen to the bottom.

Figure 3:
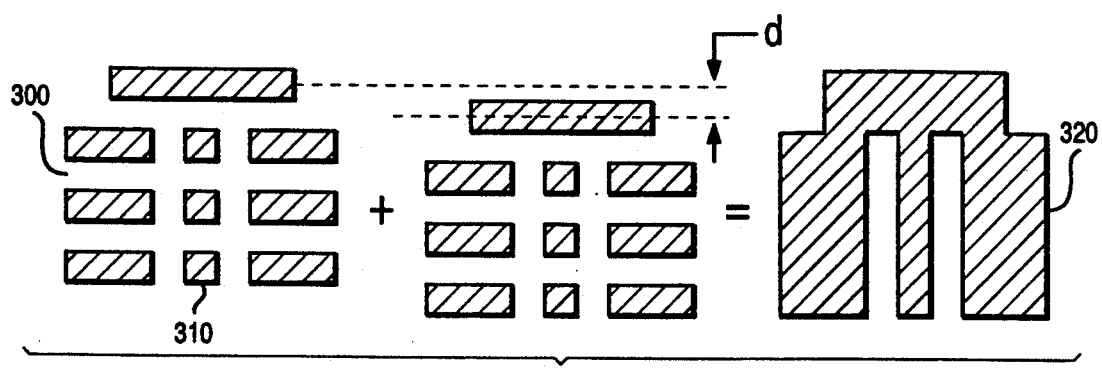
FIG. 3 is an explanatory views of a character displayed in accordance with the present invention.

FIG. 3(left side) shows an example of a character displayed in a frame corresponding to a high state in the square wave. The spot size is made small to optimize the inner character contrast ratio; there are gaps between adjacent pixels on successive lines of the raster. The brightness modulation index is therefore poor. FIG. 3(center) shows the same character displayed in the next frame when the square wave has toggled to a low state. The character is shifted vertically by an amount equal to half the distance between successive lines of the raster. Referring now to FIG. 3(right side), if the frame sync signal is of sufficiently high frequency, the persistence of a viewer's eye effectively integrates the image content of successive frames in such a manner that relative movement, of pixels between successive frames is not detected. Thus, in appearance, the character has smooth, unbroken strokes.

In preferred embodiments of the present invention, the frame sync signal has a frequency of 75 Hz. Therefore, the pixel positions are modulated at a frequency of 37.5 Hz. However, because successive frames have the same image content, there is no low-frequency component in the image spectrum below 75 Hz. Therefore, the displayed image is free from objectionable flicker.

Figure 5:
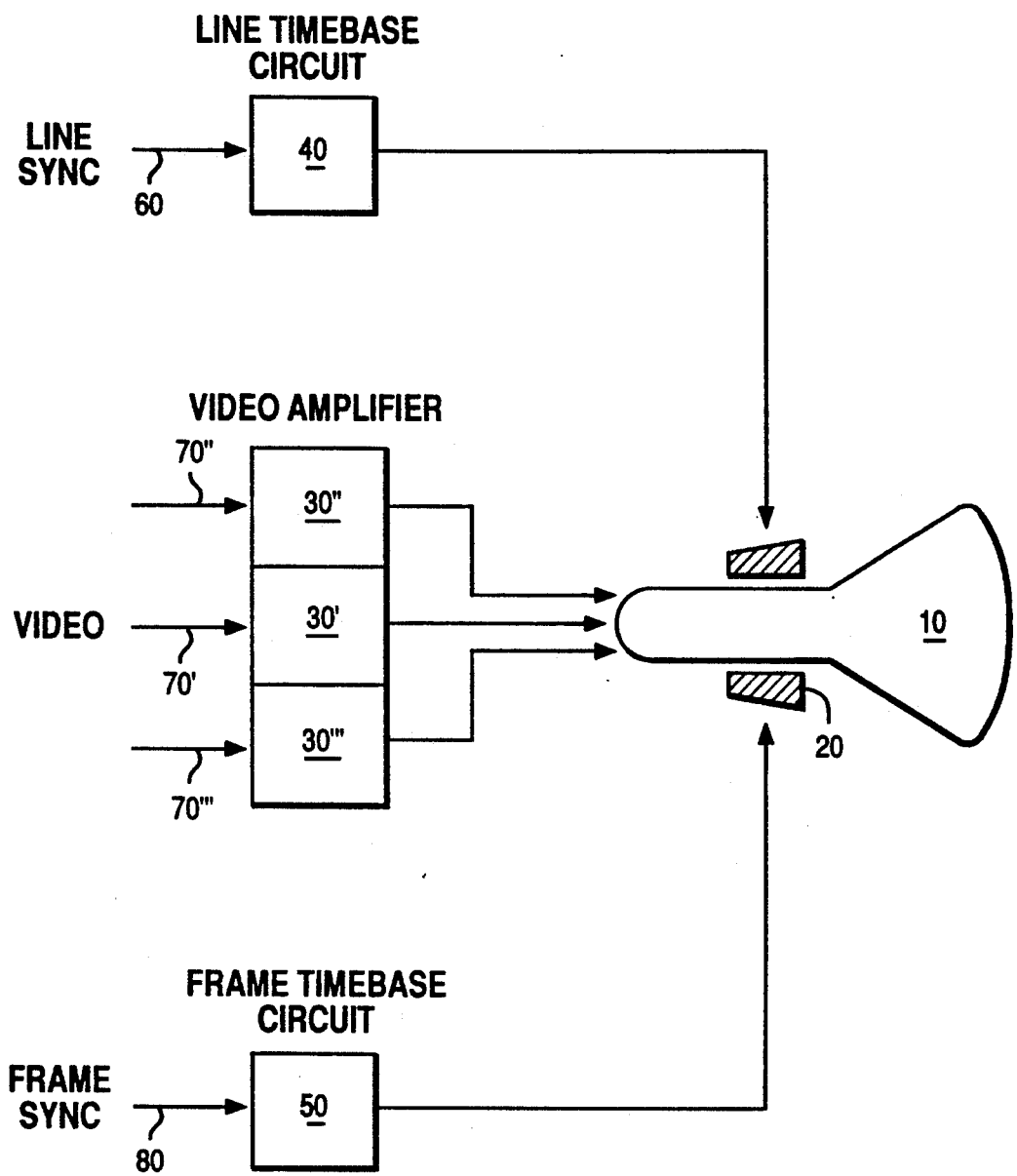
FIG. 5 is a block diagram of an alternate embodiment of the present invention.

Referring back to FIG. 1, it will now be appreciated that the present invention is equally applicable to a color CRT display in which the video signal 70 comprises red, green and blue components for driving, respectively red, green and blue electron guns in the CRT 10. FIG. 5 illustrates this embodiment with signals 70', 70", and 70'" representing red, blue, and green, respectively. Separate video amplifiers 30', 30", 30'" are provided for each signal and each drives an electron gun (not shown) for its assigned color.

Figure 4:
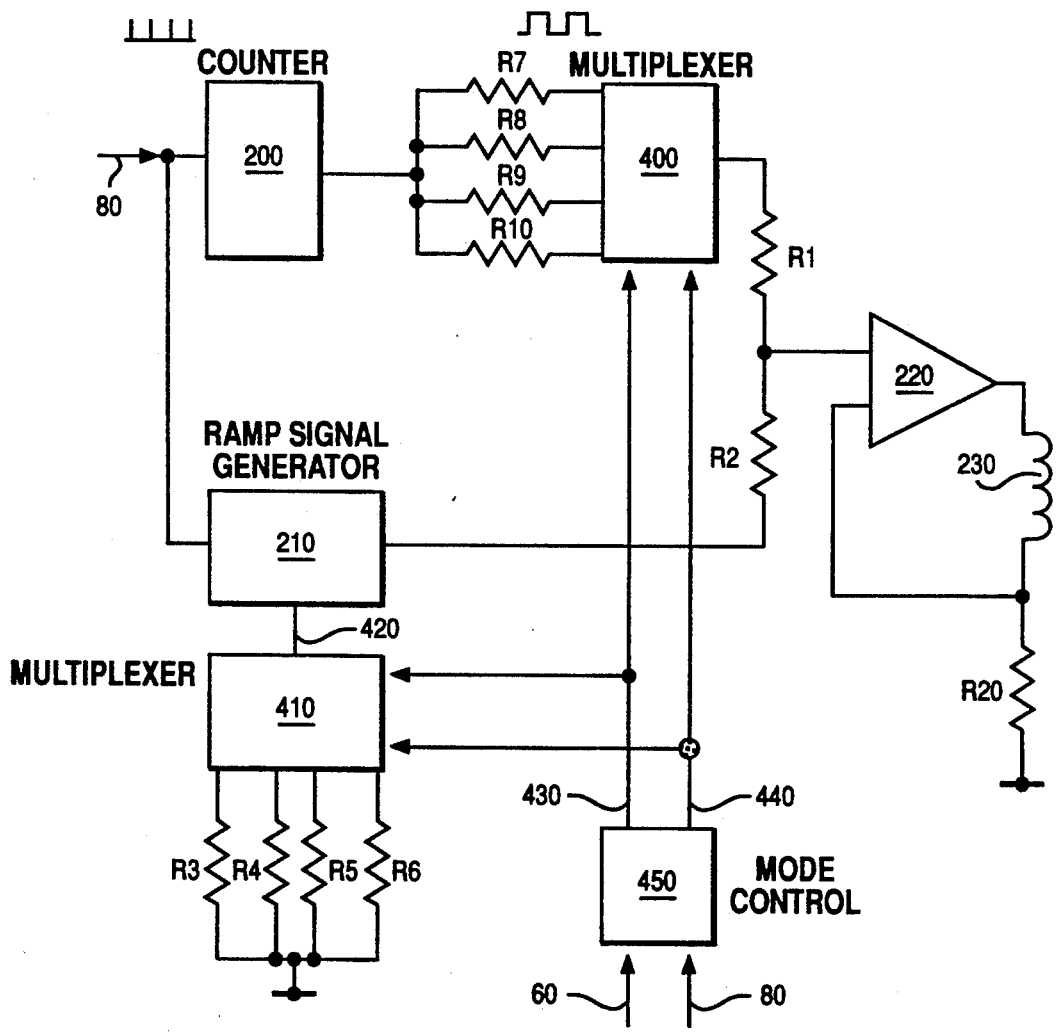
FIG. 4 is a block diagram of another frame timebase circuit in accordance with the present invention.

As will be described hereinafter, the present invention also extends to CRT displays capable of operating within a range of frame and line refresh frequencies. An example of such a display may be capable of operating in any one of four display modes with each display mode having different frame and line refresh requirements. Referring now to FIG. 4, in an example of such a display, the frame timebase circuit 50 comprises an analog multiplexer 410 having a single line output connected to a reference input 420 of the ramp signal generator 210. The multiplexer 410 has a pair of binary control inputs, 430 and 440, connected to a mode control circuit 450 and four line inputs connected to a supply voltage via four resistors R3–R6. The mode control circuit 450 is connected to the line sync signal 60 and the frame sync signal 80. Another analog multiplexer 400 has a line output connected to the input of the power amplifier 220 via resistor R1. The multiplexer 400 also has a pair of binary control inputs, 430 and 440, connected to the mode control circuit 450 and four line inputs connected to the output of the divide-by-two counter 200 via four resistors R7–R10.

In operation, the mode control circuit 450 decodes the line and frame sync signals, 60 and 80, to determine the required display mode and sets the control inputs, 430 and 440, to one of four possible binary permutations, 01, 10, 11, and 00, accordingly. The control inputs, 430 and 440, determine, via the multiplexer 410, which one of the four resistors, R3–R6, connects the supply voltage V to the reference input of the ramp generator 210. Each value of the resistors, R3–R6, is selected to configure the ramp generator 210 to generate a ramp signal corresponding to a different one of the four display modes. Similarly, the control inputs, 430 and 440, determine, via multiplexer 400, which one of the four resistors, R7–R10, is connected in series with R1 between the output of the counter 210 and the input of the power amplifier 220. Each value of the resistors, R7 to R10, is selected to set, in accordance with a different one of the four display modes, the amplitude of the square wave added to the ramp signal at the input of the power amplifier 220.

It will be appreciated from the foregoing that the present invention provides a cathode ray tube display apparatus comprising: a cathode ray tube display screen (10) for displaying successive frames of a non-interlaced video image in response to excitation by at least one raster-scanned electron beam, a line timebase circuit (40) for sequentially addressing each electron beam to successive pixels on the screen in a line of a raster in response to a line timebase sync signal, and a frame timebase circuit (50) for sequentially addressing each electron beam to successive lines of the raster in response to a frame timebase sync signal. The frame timebase circuit (50) comprises means for offsetting successive frames of the video image in a direction transverse of the lines of the raster by a distance less than the spacing of adjacent lines of the raster. Gaps between adjacent pixels on successive lines of the raster are thus made invisible to the viewer because the persistence of a viewer's eye effectively integrates the image content of successive frames. Also, because the successive frames have the same image content, there is no low-frequency component in the image spectrum below the frame timebase frequency. Therefore, the displayed image is advantageously free from objectionable flicker.

What is claimed is:

1. Cathode ray tube display apparatus comprising:
    a cathode ray tube display screen for displaying successive frames of a non-interlaced video image in response to excitation by a raster-scanned electron beam;
    a line timebase circuit for sequentially addressing the electron beam to successive pixels on the screen in a line of a raster in response to a line timebase sync signal; and
    a frame timebase circuit for sequentially addressing the electron beam to successive lines of the raster in response to a frame timebase sync signal;
    characterized in that the frame timebase circuit comprises offset means for offsetting successive frames of the video image in a direction transverse of the lines of the raster by a distance less than the spacing of adjacent lines of the raster, wherein the offset means comprises a divide-by-two counter responsive to the line timebase sync signal for generating a square wave signal of half the frequency of the line timebase sync signal in such a manner that successive frames of the raster correspond to alternate levels of the square wave signal.

2. Apparatus as claimed in claim 1 wherein the frame timebase circuit comprises a ramp signal generator for generating a ramp signal in response to the frame timebase sync signal, and the offset means comprises a summing amplifier for adding the square wave signal to the ramp signal to offset successive frames of the video image.

3. Apparatus as claimed in claim 2 wherein the summing amplifier comprises a power amplifier having an input connected to the counter via a first resistor and to the ramp generator via a second resistor, and an output connected to a frame electromagnetic deflection coil of the cathode ray tube.

4. Apparatus as claimed in claim 1 wherein the offset means comprises an analog multiplexer for selecting any one of a plurality of amplitudes for the square wave signal in response to a digital control signal indicative of a desired one of a plurality of display modes of operation.

5. Apparatus as claimed in claim 1 wherein the frame timebase circuit is configured to scan successive frames of the video image at a frequency of at least 70 Hz.

6. Apparatus as claimed in claim 1 wherein the cathode ray tube display screen is a color cathode ray tube display screen.

7. Apparatus as claimed in claim 1 wherein said cathode ray tube display screen is responsive to excitation by a plurality of electron beams, said line timebase circuit sequentially addressing each of said beams to successive pixels on the screen in a line of said raster in response to said line timebase sync signal, said frame timebase circuit sequentially addressing each of said beams to successive lines of said raster in response to said frame timebase sync signal.

* * * * *